(12) United States Patent
Matsuzaki et al.

(10) Patent No.: US 12,036,938 B2
(45) Date of Patent: Jul. 16, 2024

(54) OCCUPANT PROTECTION DEVICE

(71) Applicant: TOYODA GOSEI CO., LTD., Kiyosu (JP)

(72) Inventors: Yuji Matsuzaki, Kiyosu (JP); Akira Yasuda, Kiyosu (JP); Yuto Noda, Kiyosu (JP); Motoyuki Tanaka, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 5 days.

(21) Appl. No.: 17/948,295

(22) Filed: Sep. 20, 2022

(65) Prior Publication Data
US 2023/0123318 A1    Apr. 20, 2023

(30) Foreign Application Priority Data

Sep. 29, 2021 (JP) .................. 2021-159385

(51) Int. Cl.
*B60R 21/18* (2006.01)
*B60R 21/233* (2006.01)
*B60R 21/2338* (2011.01)

(52) U.S. Cl.
CPC ............ *B60R 21/18* (2013.01); *B60R 21/233* (2013.01); *B60R 21/2338* (2013.01); *B60R 2021/23316* (2013.01); *B60R 2021/23382* (2013.01)

(58) Field of Classification Search
CPC .................................................. B60R 21/18
See application file for complete search history.

(56) References Cited

U.S. PATENT DOCUMENTS

| 2006/0290114 | A1 | 12/2006 | Suyama |
| 2015/0069741 | A1 | 3/2015 | Shimazu |
| 2015/0197210 | A1* | 7/2015 | Abe ............... B60R 21/206 280/729 |
| 2019/0299899 | A1 | 10/2019 | Einarsson et al. |
| 2021/0094496 | A1 | 4/2021 | Tanaka et al. |

FOREIGN PATENT DOCUMENTS

| DE | 1902793 A1 | 8/1970 |
| JP | 2015-51744 A | 3/2015 |
| WO | WO-0100456 A1 * | 1/2001 ............ B60R 21/18 |

OTHER PUBLICATIONS

Extended European Search Report dated Mar. 1, 2023 issued in corresponding EP Patent Application No. 22197783.8.

\* cited by examiner

*Primary Examiner* — Keith J Frisby
(74) *Attorney, Agent, or Firm* — Posz Law Group, PLC

(57) ABSTRACT

An occupant protection device has a folded airbag in a holding body in front of a hip portion of an occupant. The airbag protrudes from the holding body when an inflating gas flows, inflates to cover a region in front of the occupant, and includes an occupant side wall portion on the occupant side when inflation completes, and restrains an upper body of the occupant. The occupant side wall portion has a lower side restraining face, which restrains a range from an abdominal portion to a chest portion of the occupant, and an upper side restraining face, which restrains a head portion or a shoulder portion of the occupant, on a rear face side when inflation completes, and a bended portion is in a boundary region between the upper side restraining face and the lower side restraining face, and the upper side restraining face protrudes to the occupant side.

7 Claims, 17 Drawing Sheets

Schematic Sectional View at A-A

Schematic Sectional View at B-B

Schematic Sectional View at C-C

OCCUPANT PROTECTION DEVICE

CROSS REFERENCE TO RELATED APPLICATIONS

The present application claims priority from Japanese Patent Application No. 2021-159385 of Matsuzaki et al., filed on Sep. 29, 2021, the entire disclosures of which is incorporated herein by reference.

BACKGROUND

1. Technical Field

The present disclosure relates to an occupant protection device for protecting an occupant seated in a seat.

2. Description of Related Art

As an existing occupant protection device, there is an occupant protection device of a configuration shown in JP-A-2015-51744. The existing occupant protection device is of a configuration wherein a folded airbag is disposed in a seat belt in a region of a lap belt that restrains a hip portion (waist portion) of an occupant when fastened, and the airbag is caused to inflate in such a way as to cover the occupant from the front by an inflating gas from an inflator being caused to flow into an interior. The existing occupant protection device is of a configuration wherein a lower side region, which protects a chest portion and an abdominal portion of an occupant, and an upper side region, which protects a head portion, are caused to inflate with a time difference provided in the airbag, with firstly the lower side region being caused to inflate, then the upper side region being caused to inflate.

However, the existing occupant protection device is of a configuration such that when the inflator operates, firstly, the chest portion of the occupant is received by the inflated lower side region, meaning that the chest portion immediately comes into contact with the airbag. Because of this, there is room for improvement in the existing occupant protection device in terms of restricting a pressing force with respect to the chest portion, thereby protecting an upper body of the occupant gently.

SUMMARY

The present disclosure relates to an occupant protection device of the following configuration.

An occupant protection device for protecting an occupant seated in a seat is of a configuration including an airbag as a bag form configured of a sheet body having flexibility, a holding body in which the folded airbag is caused to be housed and held, and which is disposed in front of a hip portion of an occupant seated in the seat, and an inflator that can supply an inflating gas to the airbag, wherein the airbag is of a configuration such as to protrude from the holding body owing to the inflating gas being caused to flow into an interior, and inflates in such a way as to cover a region in front of the occupant, and is configured to include an occupant side wall portion that is disposed on the occupant side when inflation is completed, and can restrain an upper body of the occupant, and the occupant side wall portion is configured in such a way that a lower side restraining face, which can restrain a range from an abdominal portion to a chest portion of the occupant, and an upper side restraining face, which can restrain a head portion or a shoulder portion of the occupant, are disposed on a rear face side when inflation is completed, and a curved (bended) portion is disposed in a boundary region between the upper side restraining face and the lower side restraining face in such a way as to cause the upper side restraining face to protrude to the occupant side with respect to the lower side restraining face.

DETAILED DESCRIPTION

Exemplary embodiments of the present disclosure are described below with reference to the accompanying drawings. However, the invention is not limited to the embodiments disclosed herein. All modifications within the appended claims and equivalents relative thereto are intended to be encompassed in the scope of the claims.

Figure 1:
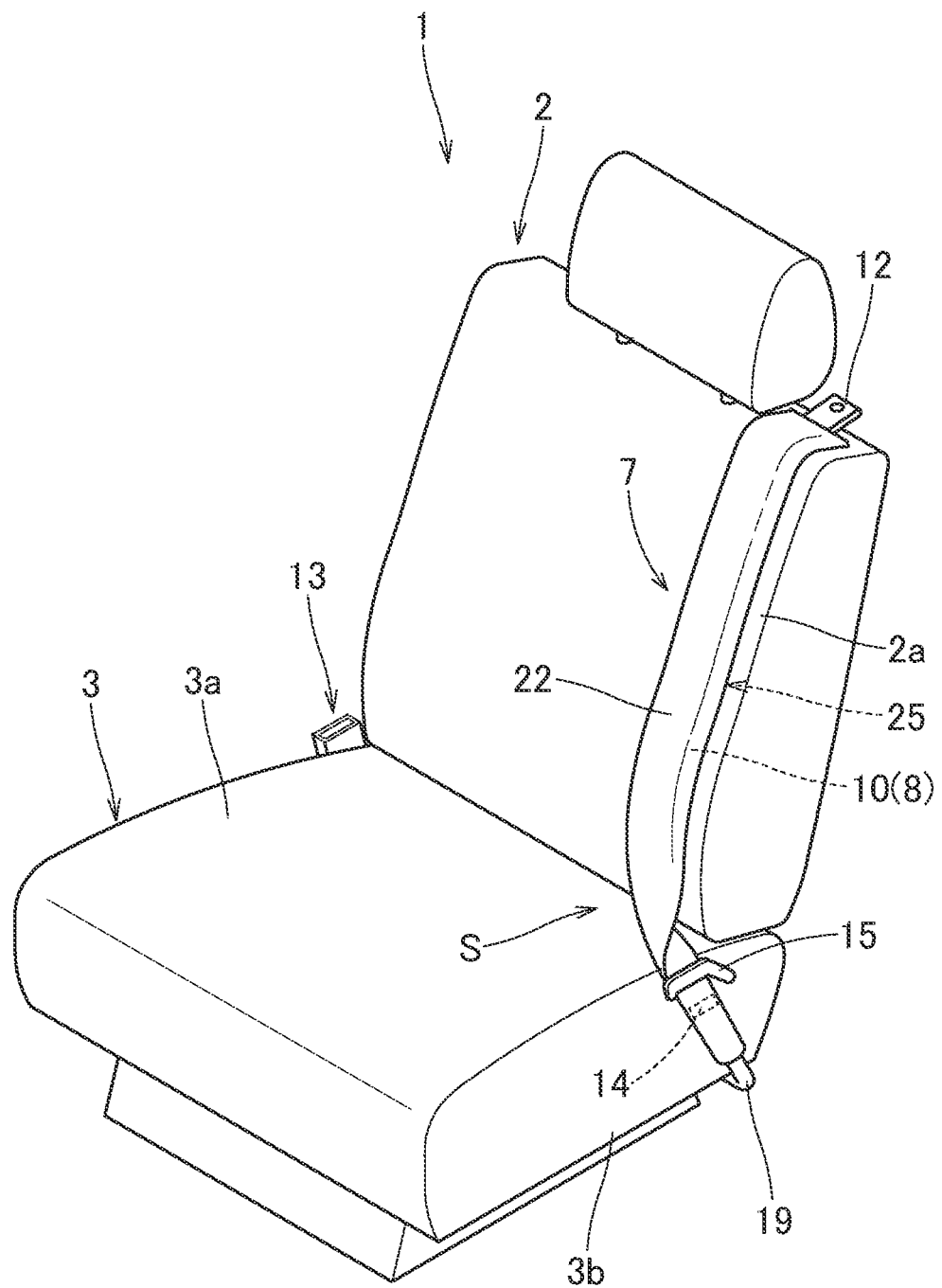
FIG. 1 is a perspective view of a seat on which an occupant protection device that is an embodiment of the present disclosure is mounted.
Figure 2:
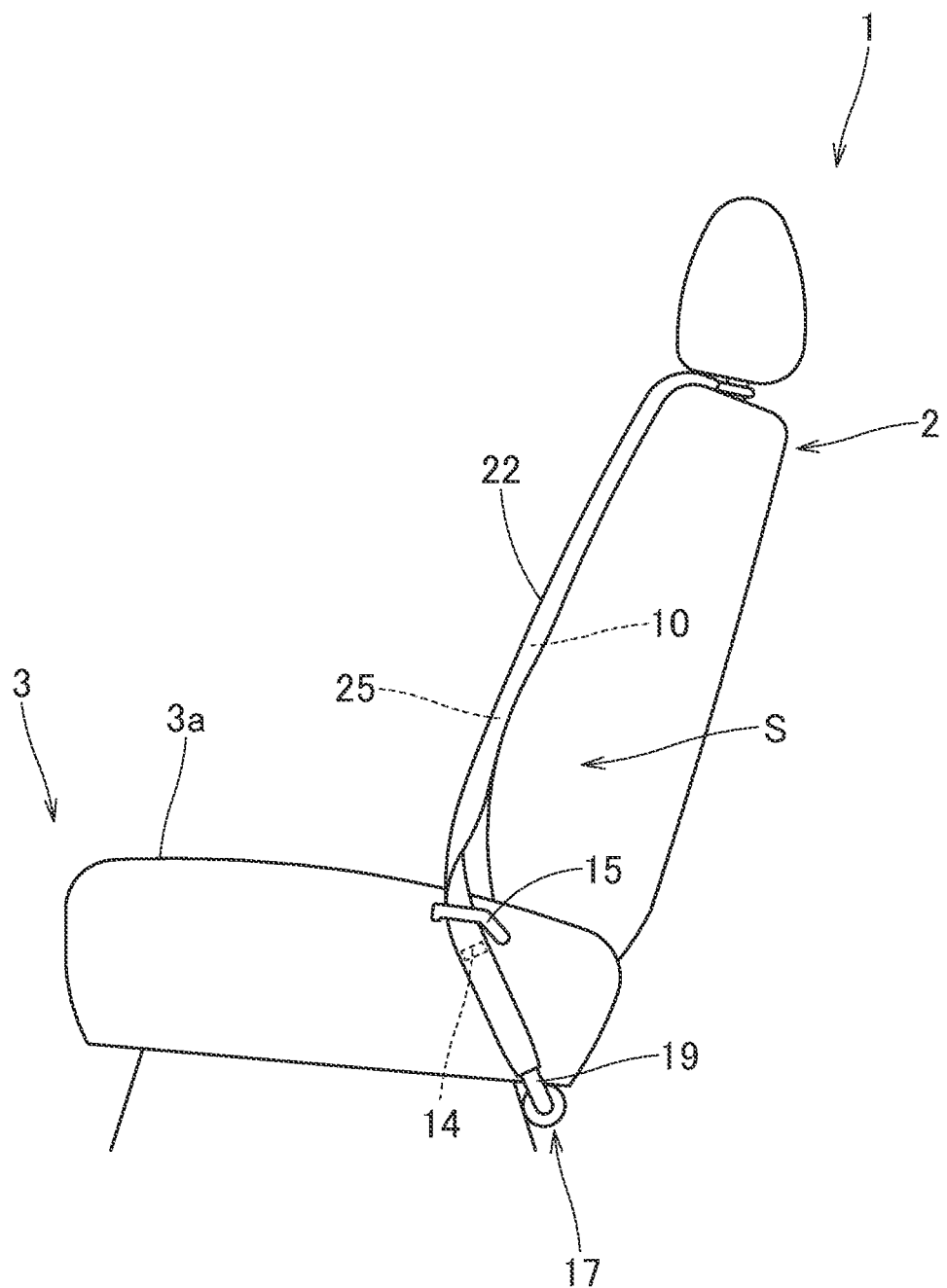
FIG. 2 is a side view of the seat of FIG. 1.
Figure 3:
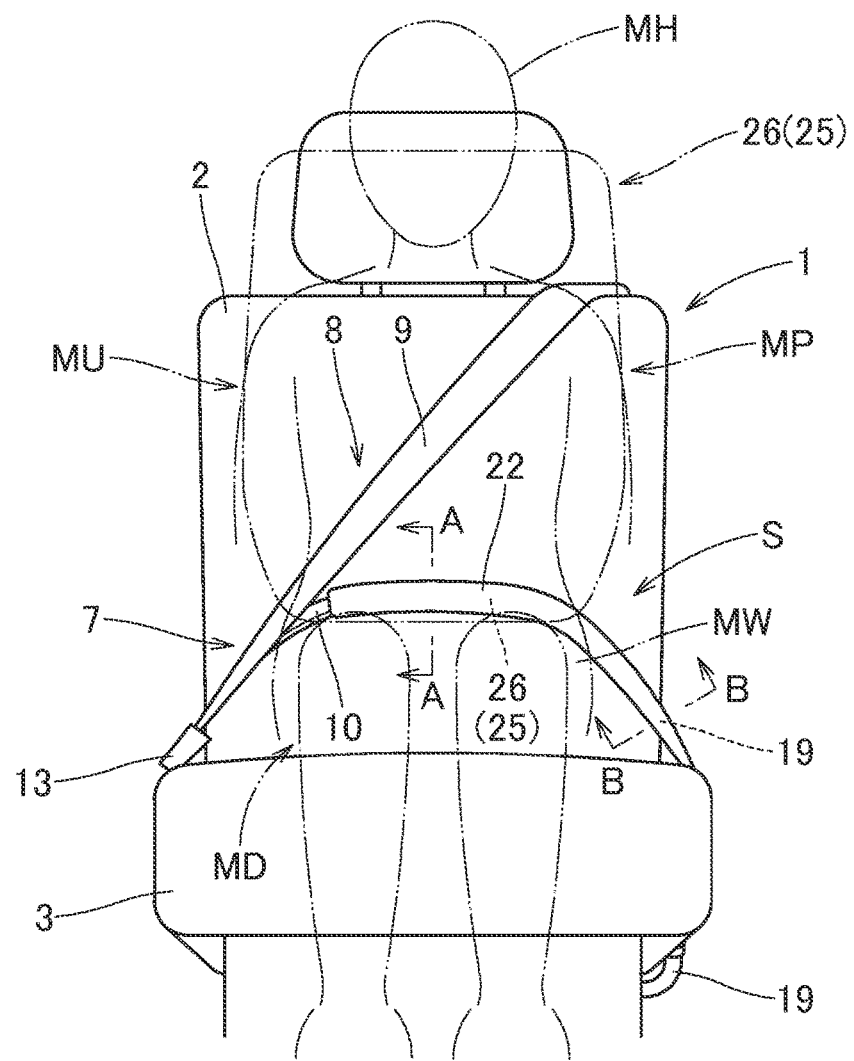
FIG. 3 is a front view of the seat of FIG. 1, and shows a state wherein a seat belt is fastened.
Figure 3:
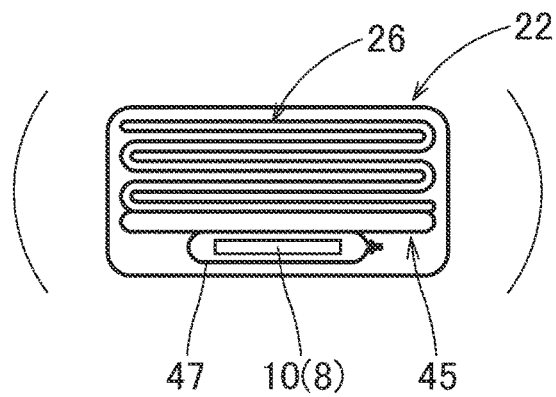
Figure 3:
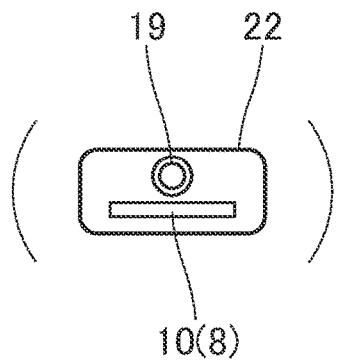

Hereafter, one embodiment of the present disclosure will be described based on the drawings. An occupant protection device S of the embodiment is mounted on a seat 1 of a vehicle, as shown in FIGS. 1 to 3, and includes a seat belt 7 configuring a holding body that holds an airbag 25, the airbag 25, and an inflator 17 that supplies an inflating gas to the airbag 25. The seat 1 includes a backrest portion 2 and a sitting portion 3. In the embodiment, front-rear, up-down, and left-right directions correspond to front-rear, up-down, and left-right directions of the seat 1, unless otherwise stated.

In the case of the embodiment, the seat belt 7 is mounted on the seat 1, and includes a belt main body 8 for restraining an occupant MP seated in the seat 1, a tongue plate 12 attached to the belt main body 8, and a buckle 13 for causing the tongue plate 12 to be coupled. One end of the belt main body 8 is engaged with a winding shaft of an unshown retractor disposed inside the backrest portion 2, and another end side is engaged with an anchoring member 14 (refer to FIGS. 1 and 2) disposed to the left of a rear end 3b of the sitting portion 3 of the seat 1. Specifically, the belt main body 8 is disposed in such a way as to be exposed to an exterior from an upper end left edge side of the backrest portion 2, and in the case of the embodiment, is configured in such a way as to cause a lap belt 10 acting as a holding body caused to hold the airbag 25 to be exposed on a front face of the backrest portion 2 in a state wherein the occupant MP is not seated, as shown in FIGS. 1 and 2. Specifically, the lap belt 10 is exposed on the front face of the backrest portion 2 in such a way as to approximately follow the up-down direction on a left edge 2a side of the backrest portion 2 in a state wherein the occupant MP is not seated, as shown in FIG. 1. The belt main body 8 includes the lap belt 10 and a shoulder belt 9 housed inside the backrest portion 2. The belt main body 8 is of a configuration wherein, in a state wherein the tongue plate 12 is coupled to the buckle 13 when an occupant is seated, a lower body MD (a hip (waist) portion MW) of the occupant MP is restrained by the lap belt 10, which is disposed in such a way as to approximately follow the left-right direction between the anchoring member 14 and the buckle 13, and an upper body MU (from a shoulder portion MS to a chest portion MB) of the occupant MP is restrained by the shoulder belt 9, which is disposed diagonally as far as the buckle 13 while extending from the upper end left edge side of the backrest portion 2 (refer to FIG. 3). Further, in the case of the embodiment, the lap belt 10, which is disposed in front of the hip portion MW of the occupant MP seated in the seat 1, and a cover 22 to be described hereafter configure a holding body in which the folded airbag 25 is housed and held. The unshown retractor disposed inside the backrest portion 2 in the seat belt 7 has a pretensioner mechanism.

The inflator 17 is mounted on the seat 1, and specifically, in the case of the embodiment, is disposed in a position below a seat face 3a in the seat 1. Specifically, the inflator 17 has an approximately cylindrical external form, and is disposed with an axial direction approximately following the left-right direction in a position below the sitting portion 3 on a rear face side of the seat 1, as shown in FIG. 2. In the case of the embodiment, the inflator 17 is coupled to a connection port portion 45, to be described hereafter, of the airbag 25 by a coupling tube 19. The coupling tube 19 has flexibility and is bendable together with the lap belt 10. In the case of the embodiment, a start of an operation of the inflator 17 is set to be later than that of the pretensioner mechanism of the seat belt 7, in order to restrict a withdrawal of the belt main body 8 of the seat belt 7 accompanying an inflation of the airbag 25. Specifically, the inflator 17 is set to operate 5 milliseconds after an operation of the pretensioner mechanism of the seat belt 7.

The airbag 25 is folded in an elongated form while being held in the lap belt 10 (as the holding body), and a periphery thereof is covered by the cover 22. Specifically, with the folded airbag 25 in a stacked form on an upper face side of the lap belt 10 when the seat belt 7 is fastened, the periphery of the airbag 25 is covered by the cover 22, and the airbag 25 is disposed in a region of the lap belt 10 (refer to FIG. 3). In other words, in the embodiment, the airbag 25 is folded and housed in a gap between the lap belt 10 and the cover 22. Also, in the kind of non-fastened state shown in FIG. 1, the airbag 25 is disposed on a rear face side (the backrest portion 2 side) of the lap belt 10 exposed on the front face of the backrest portion 2. The cover 22 is configured of a sheet body having flexibility, and is configured in such a way that a specific place is broken when the airbag 25 starts inflating, and a bag main body 26, to be described hereafter, in the airbag 25 can protrude. Also, in the occupant protection device S of the embodiment, the coupling tube 19 that connects the connection port portion 45 of the airbag 25 and the inflator 17 is covered by the cover 22. The coupling tube 19 is also disposed on the upper face side of the lap belt 10 (specifically, a region in the lap belt 10 between the anchoring member 14 and a disposition region of the airbag 25) when the seat belt 7 is fastened (refer to FIG. 3).

Figure 4:
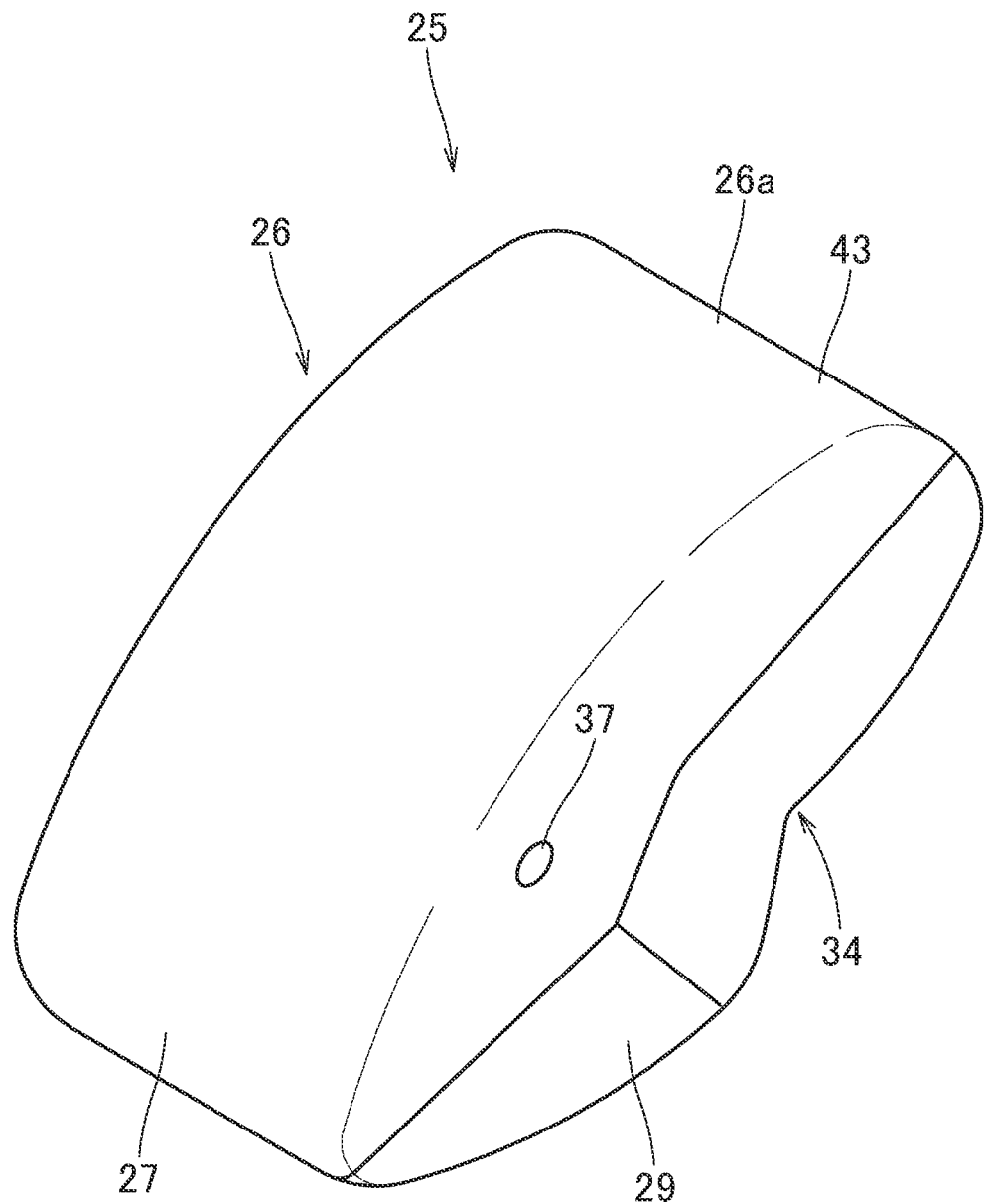
FIG. 4 is a schematic perspective view showing a state wherein an airbag used in the occupant protection device of the embodiment is inflated individually.
Figure 5:
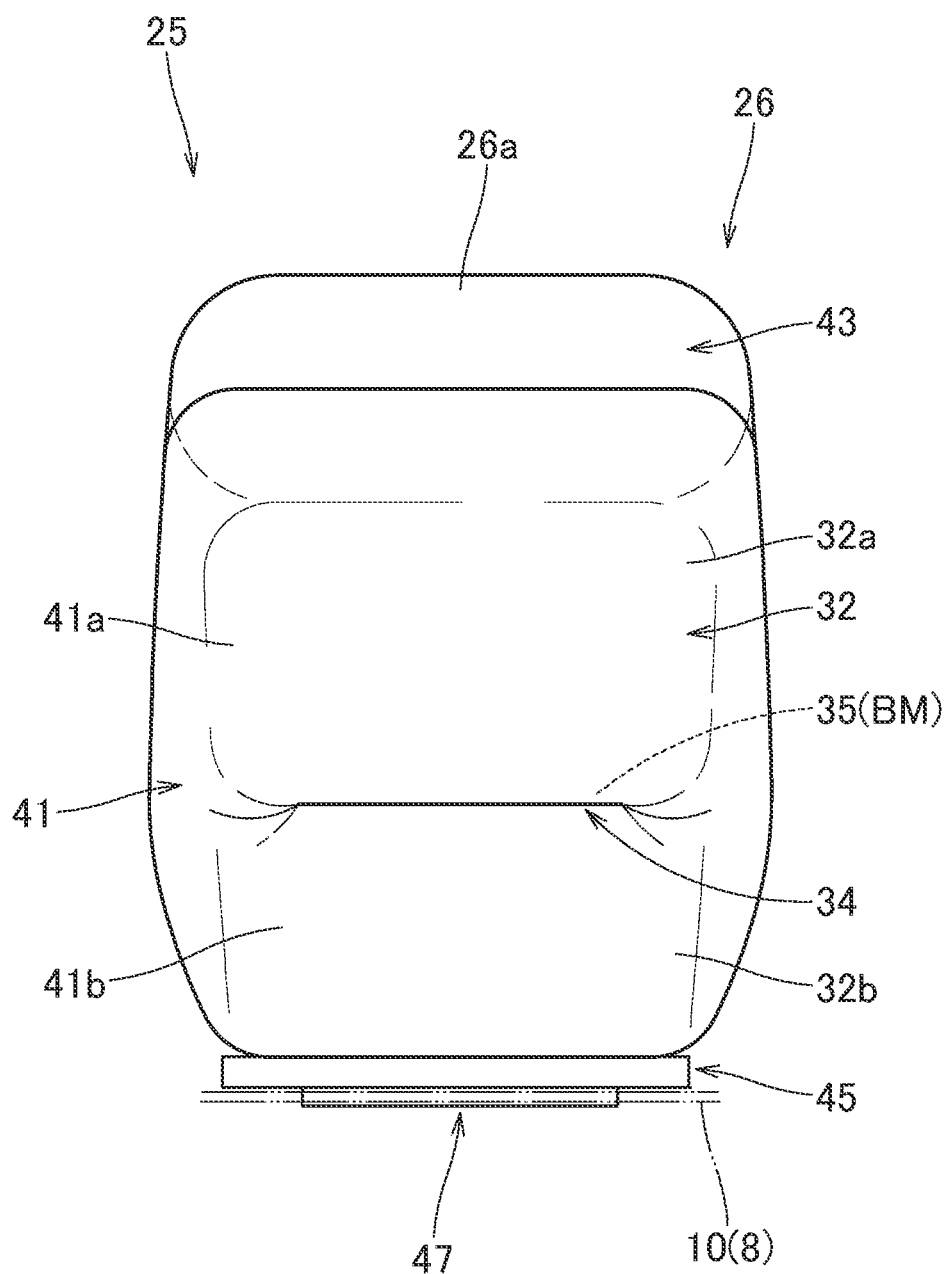
FIG. 5 is a rear view of the airbag of FIG. 4.
Figure 6:
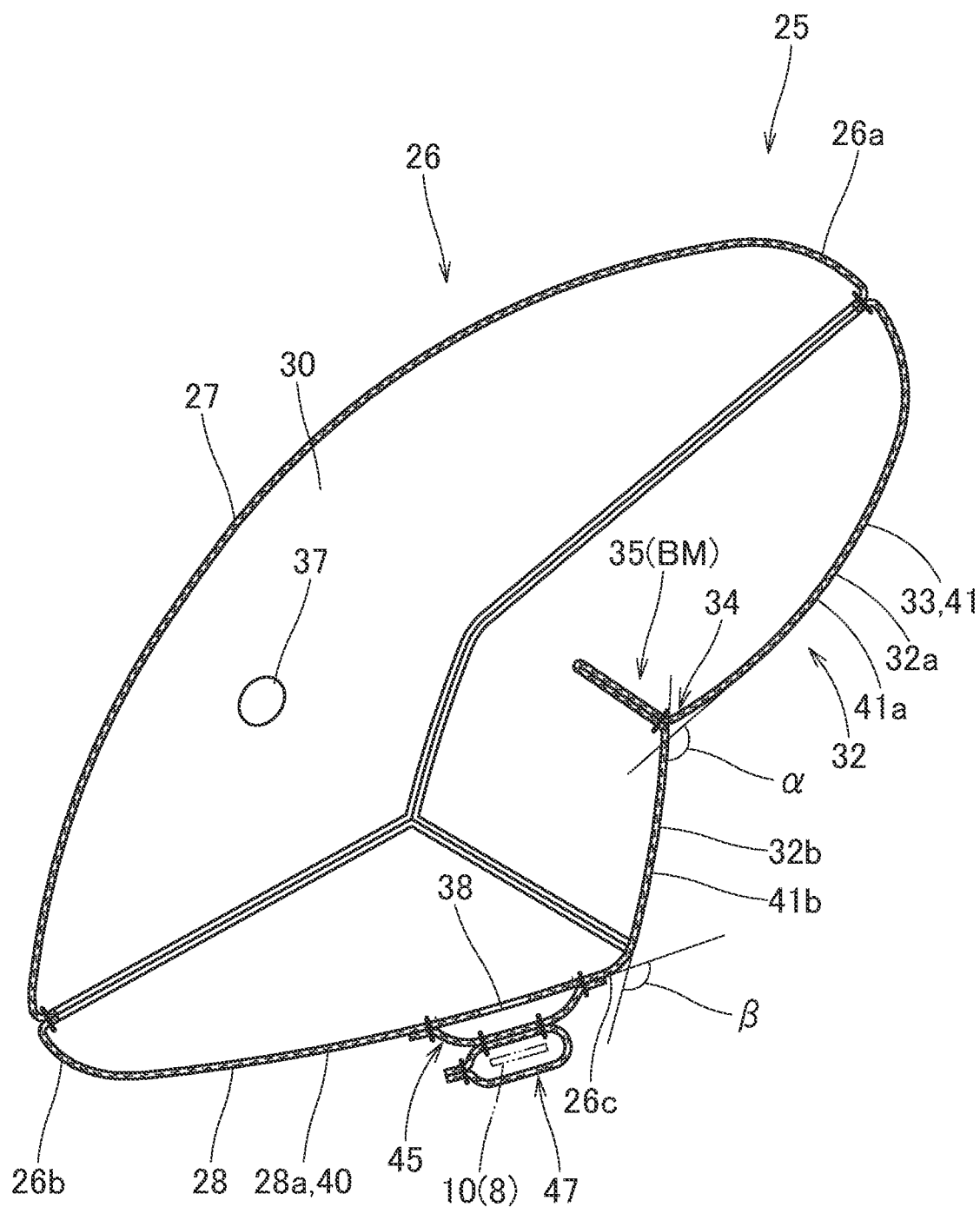
FIG. 6 is a schematic vertical sectional view of the airbag of FIG. 4.

As shown in FIGS. 4 to 6, the airbag 25 includes the bag main body 26, the connection port portion 45 connected to the coupling tube 19 extending from the inflator 17, and an attachment portion 47 for attaching the bag main body 26 to the lap belt 10.

In the case of the embodiment, the bag main body 26 is such that an external form when inflation is completed is an approximately triangular prismatic form whose axial direction approximately follows the left-right direction and which is wide front-to-rear as far as a bottom end side, as shown in FIGS. 4 and 6. And, the inflated bag main body 26 is bended in an up-down intermediate region, and a region on an upper end 26a side when inflation is completed is to face the rear, which is the occupant MP side. Specifically, the bag main body 26 includes an occupant side wall portion 32 disposed on the occupant MP side (rear side) when inflation is completed, a front wall portion 27 disposed on a front-rear direction side opposing the occupant side wall portion 32, a lower wall portion 28 disposed on a lower end side when inflation is completed, and a left wall portion 29 and a right wall portion 30 disposed opposing on left-right direction sides when inflation is completed. Also, in the bag main body 26, a bended (curved) portion 34 is disposed in an up-down intermediate region of the occupant side wall portion 32. And the bag main body 26 is bended in an up-down intermediate region as seen from left and right sides in such a way as to cause the upper end 26a side when inflation is completed to protrude to the occupant MP side (rearward). Two vent holes 37 that can discharge excess inflating gas that has flowed into an interior are formed in the left wall portion 29 and the right wall portion 30. Specifically, each of the vent holes 37 is formed in a position in the left wall portion 29 and the right wall portion 30 that is slightly below an up-down center, and on a front edge side.

Figure 12:
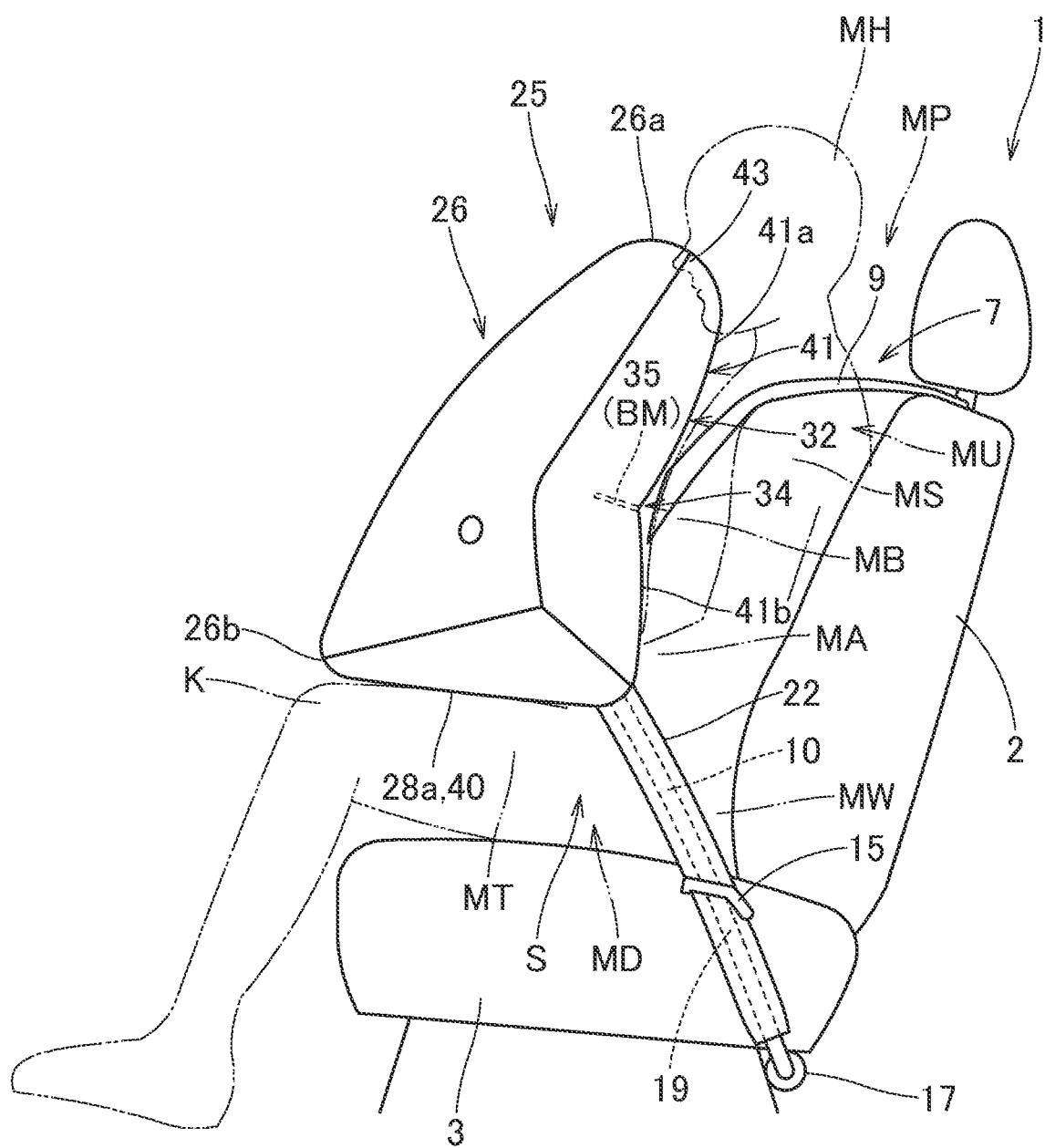
FIG. 12 is a side view of the seat in a state wherein inflation of the airbag is completed in the occupant protection device of the embodiment.

In the bag main body 26 of the embodiment, a lower face 28a of the lower wall portion 28 configures a supported face 40 that comes into contact with a thigh portion MT of the occupant MP, and is supported by the thigh portion MT, when the upper body MU of the occupant MP is received by the inflated bag main body 26. The lower wall portion 28 is disposed in such a way as to approximately follow the thigh portion MT when inflation of the bag main body 26 is completed (refer to FIG. 12).

In the bag main body 26, a rear face 33 of the occupant side wall portion 32 disposed on the occupant MP side when inflation is completed configures an upper body restraining face 41 that can restrain the upper body MU of the occupant MP (refer to FIGS. 5 and 6). The upper body restraining face 41 includes a lower side restraining face 41b, which can restrain a range from an abdominal portion MA to the chest portion MB of the occupant MP, and an upper side restraining face 41a, which can restrain the head portion MH or the shoulder portion MS (in the case of the embodiment, the head portion MH) of the occupant MP. Also, in the occupant side wall portion 32, the bended (curved) portion 34 is disposed in a boundary region between the upper side restraining face 41a and the lower side restraining face 41b in such a way as to cause the upper side restraining face 41a to protrude to the occupant MP side (rear side) with respect to the lower side restraining face 41b when inflation of the bag main body 26 is completed. In the case of the embodiment, with a tuck portion 35 formed by the occupant side wall portion 32 being pinched in regions separated on up-down direction sides and the regions being joined to each other as a bended portion forming means BM, the bended portion 34 is configured of a region of the tuck portion 35. That is, the occupant side wall portion 32 is of a configuration such that, with the tuck portion 35 formed in an up-down intermediate region when inflation of the bag main body 26 is completed as a starting point, an upper side region 32a configured of a region on an upper side of the tuck portion 35 is caused to bend (curve) with respect to a lower side region 32b configured of a region on a lower side of the tuck portion 35 (refer to FIG. 6).

Figure 8:
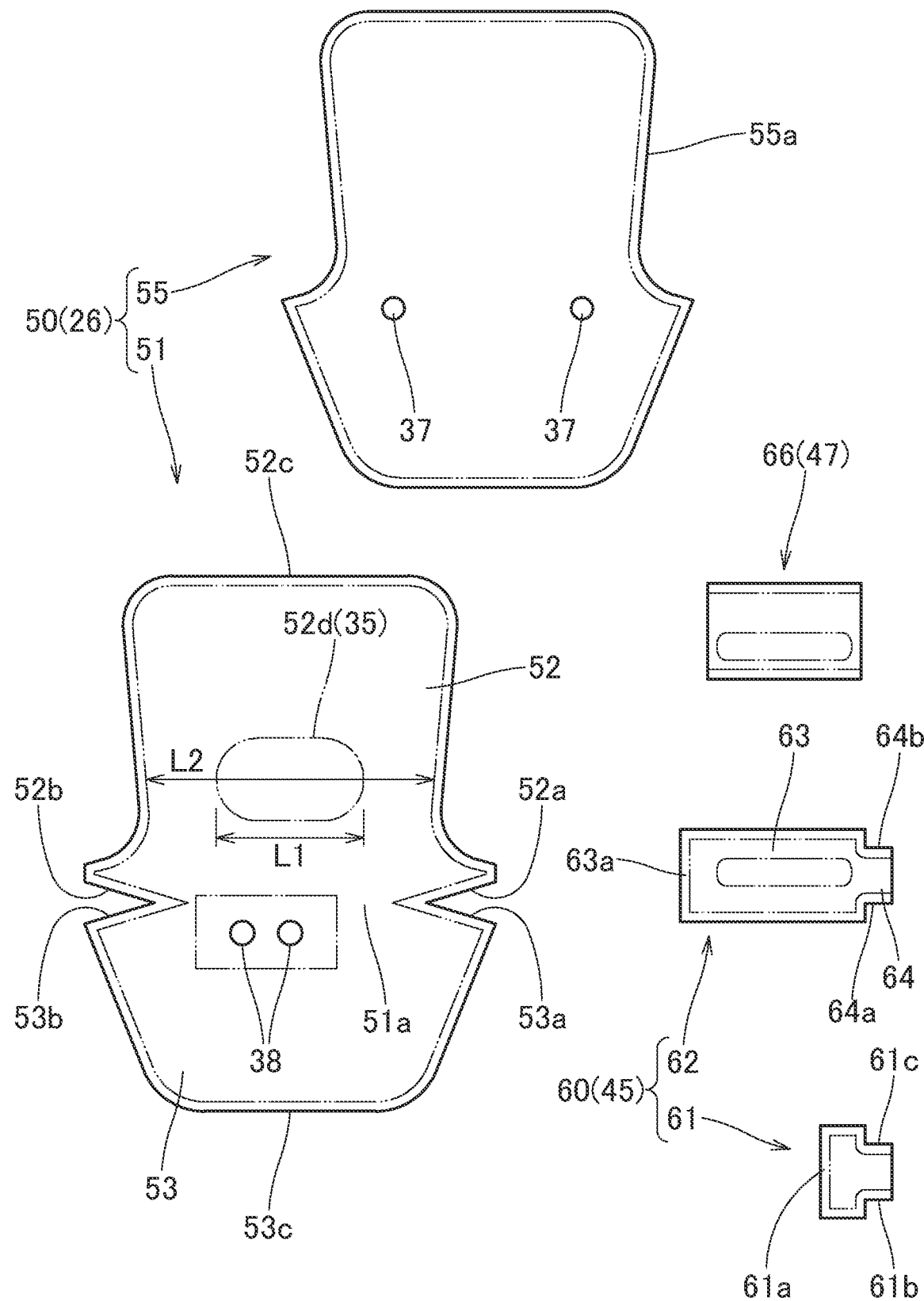
FIG. 8 is a plan view wherein base materials configuring the airbag of FIG. 4 are aligned.
Figure 9:
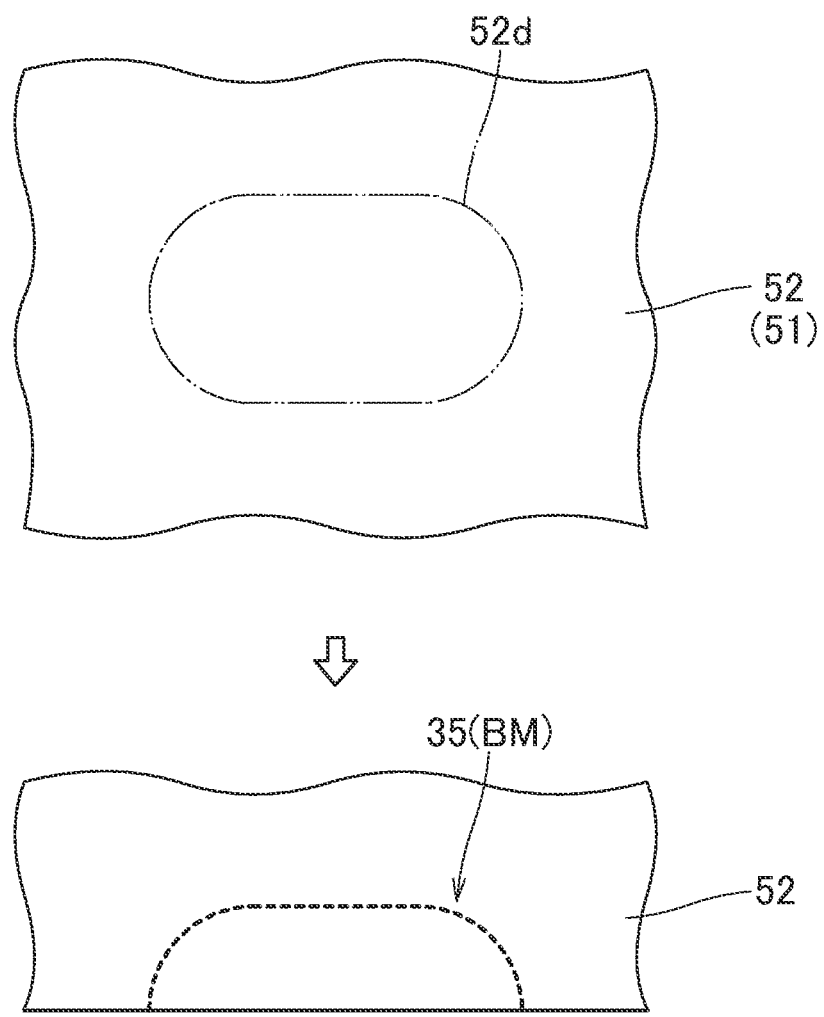
FIG. 9 is a schematic view illustrating a process of forming a tuck portion in the airbag of FIG. 4.
Figure 11:
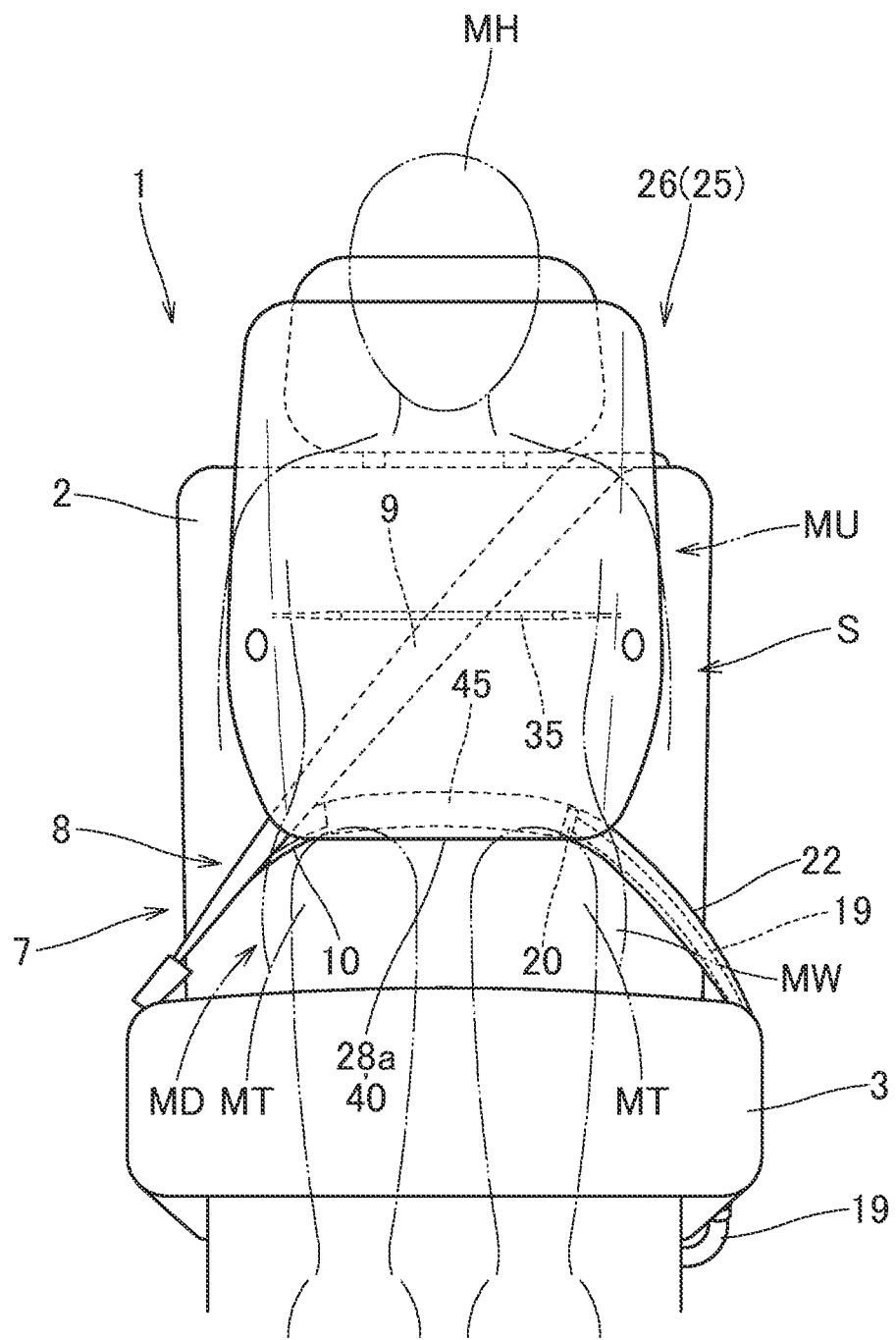
FIG. 11 is a front view of the seat in a state wherein inflation of the airbag is completed in the occupant protection device of the embodiment.

Specifically, in a state wherein an upper side region 52 of an occupant side panel 51, to be described hereafter, configuring the occupant side wall portion 32 is flattened, the tuck portion 35 is formed in a region of an approximately oval tuck formation portion 52d that approximately follows the left-right direction (refer to FIG. 8). Specifically, as shown in FIG. 9, the tuck portion 35 is formed by the upper side region 52 being partially pinched and folded in two, and the upper side regions 52 (occupant side wall portions 32) being joined to each other by sewing (joining) the tuck formation portions 52d. In the case of the embodiment, the tuck portion 35 is configured in such a way as to protrude to the front of the occupant side wall portion 32 (to an inner side of the bag main body 26) (refer to FIG. 6). The tuck portion 35 is formed in a position slightly below an up-down center of the upper side region 52 in the occupant side panel 51. Specifically, the tuck portion 35 is disposed in a position in front of the chest portion MB of the occupant MP in the inflated bag main body 26 (refer to FIG. 12). Also, in the case of the embodiment, the tuck portion 35 (the tuck formation portion 52d) is such that a left-right direction side width dimension L1 is set to be in the region of one-half of a left-right direction side width dimension L2 in a state wherein the occupant side wall portion 32 (the upper side region 52 in the occupant side panel 51) is flattened (refer to FIG. 8), and the tuck portion 35 is formed continuously, wide in the left-right direction, approximately following the left-right direction when inflation is completed (refer to FIGS. 5 and 11).

In the bag main body 26 of the embodiment, in a vertical cross-section approximately following the front-rear direction in a state individually inflated, an intersection angle α between tangents of the upper side restraining face 41a (the upper side region 32a in the occupant side wall portion 32) and the lower side restraining face 41b (the lower side region 32b in the occupant side wall portion 32) is set to be in the region of 140° (refer to FIG. 6). Also, an intersection angle β between tangents of the lower wall portion 28 (the supported face 40) and the lower side region 32b (the lower side restraining face 41b) in a state wherein the bag main body 26 is inflated individually is set to be in the region of 120° (refer to FIG. 6). The bag main body 26 is held in the seat belt 7, and is disposed in such a way as to cause the occupant side wall portion 32 to approach the lower wall portion 28 (in such a way that the intersection angles are reduced) when inflation is completed in a state wherein the occupant MP seated in the seat 1 is restrained by the seat belt 7 (refer to FIG. 12).

In the embodiment, the bag main body 26 is such that a front-rear direction side width dimension of the lower end side when inflation is completed is set to be a dimension such that a front end of the lower wall portion 28 (a front lower end 26b of the bag main body 26) is positioned slightly to the rear of a knee K of the occupant MP. Also, the bag main body 26 is such that an up-down direction side width dimension of the rear end side when inflation is completed is set to be a dimension such that the upper end 26a (an upper end of the occupant side wall portion 32) is positioned in front of the head portion MH of the occupant MP (refer to FIG. 12). Further, in the bag main body 26 of the airbag 25, the upper end 26a side region disposed protruding to the rear, which is the occupant MP side, when inflation is completed configures a head portion protection portion 43 that can protect the head portion MH of the occupant MP. Also, the bag main body 26 is configured in such a way that a left-right direction side width dimension when inflation is completed is smaller than that of the backrest portion 2 of the seat 1, and approximately equivalent to that of the upper body MU in order that the upper body MU of the occupant MP can be protected stably (refer to FIG. 11).

Figure 7:
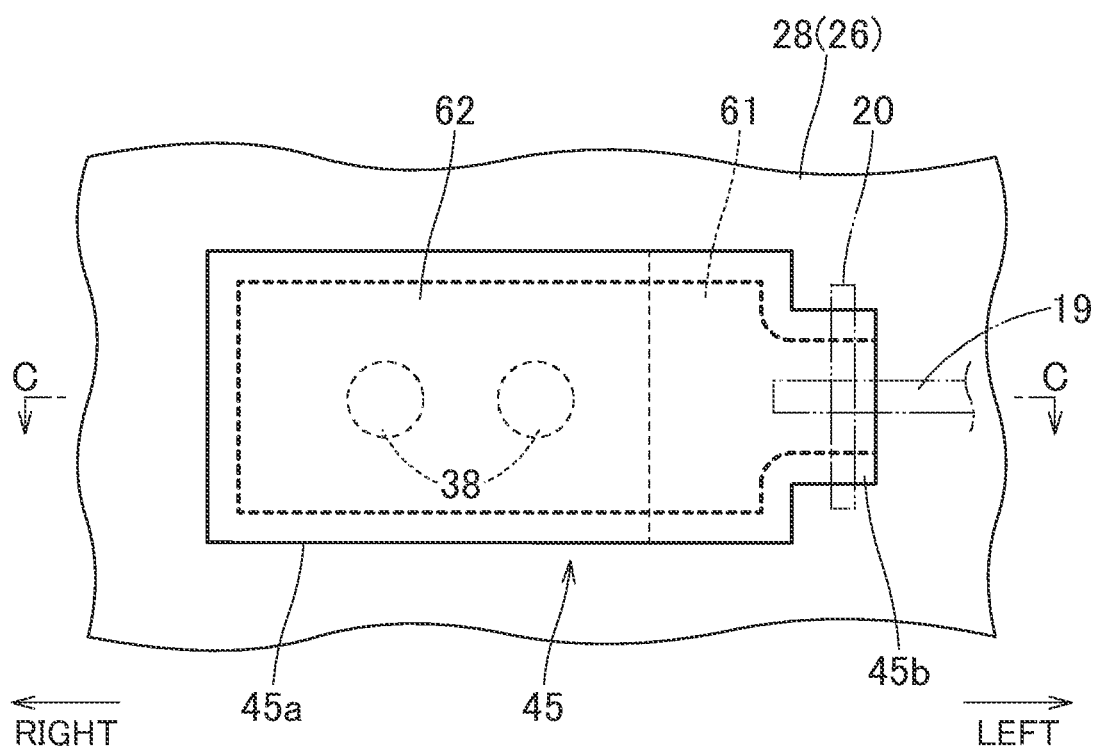
FIG. 7 is a schematic bottom view showing a region of a connection port portion in the airbag of FIG. 4.
Figure 7:
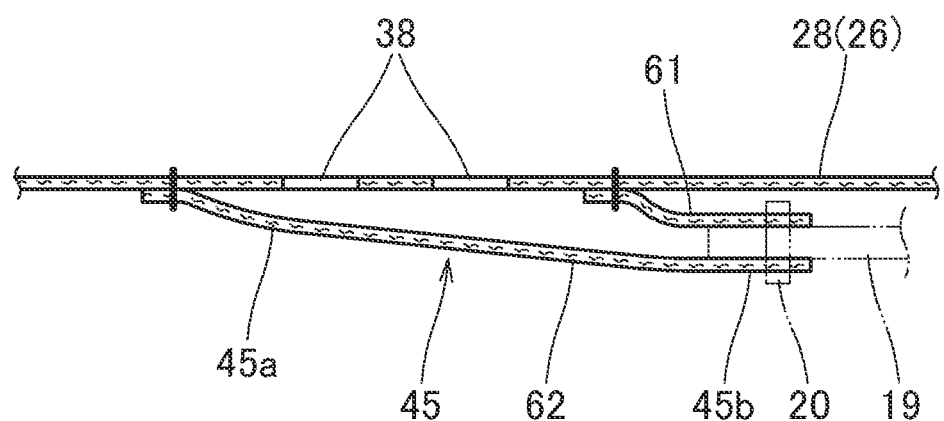

Also, in the bag main body 26 of the embodiment, the connection port portion 45 is disposed in a region on a rear lower end 26c side (a region on a rear end side of the lower wall portion 28) when inflation is completed. Two apertures 38 that communicate with the connection port portion 45 are disposed in a region covered by the connection port portion 45 in the bag main body 26 (refer to FIGS. 6 and 7). In the case of the embodiment, two aperture portions 38 opened in an approximately circular form are juxtaposed on left-right direction sides. As shown in FIGS. 6 and 7, the connection port portion 45 is disposed in such a way as to cover the apertures 38 below the rear lower end 26c side of the bag main body 26, and is of an approximately tubular form wherein only a left end side (a leading end side) to which the coupling tube 19 extending from the inflator 17 is connected is opened. Specifically, in the case of the embodiment, the connection port portion 45 is such that a leading end side region 45b connected to the coupling tube 19 is narrower than a base portion side region 45a that covers the apertures 38. The leading end side region 45b is coupled to the coupling tube 19 using a clamp 20 (refer to FIG. 7).

The attachment portion 47 that attaches the bag main body 26 to the lap belt 10 is disposed on a lower face side of the base portion side region 45a in the connection port portion 45. The attachment portion 47 is sewn to the lower face side of the base portion side region 45a in the connection port portion 45 as a tubular form disposed approximately following the left-right direction in such a way as to approximately follow the lap belt 10, and is configured in such a way that the lap belt 10 can be inserted therethrough (refer to FIGS. 5 and 6). By the lap belt 10 being inserted through the attachment portion 47, the airbag 25 is coupled to the lap belt 10, and is held by the lap belt 10. The attachment portion 47 is omitted from FIG. 7.

The airbag 25 of the embodiment is formed by peripheral edges of a base fabric of a predetermined form being joined to each other, and in the case of the embodiment, as shown in FIG. 8, the airbag 25 is configured of a main body panel 50 configuring the bag main body 26, a connection port portion panel 60 configuring the connection port portion 45, and an attachment portion panel 66 configuring the attachment portion 47. Each of the main body panel 50, the connection port portion panel 60, and the attachment portion panel 66 is formed of a woven fabric having flexibility formed from polyester, a polyamide, or the like.

The main body panel 50 includes the occupant side panel 51 and a front side panel 55. The occupant side panel 51 is disposed on the occupant MP side when inflation is completed, and mainly configures a region from the occupant side wall portion 32 to the lower wall portion 28. Specifically, the occupant side panel 51 includes the upper side region 52, which mainly configures the occupant side wall portion 32, and a lower side region 53, which mainly configures the lower wall portion 28, and has an external form such that the upper side region 52 and the lower side region 53 are coupled in a region configuring the rear lower end 26c side of the bag main body 26. The upper side region 52 configures the occupant side wall portion 32 and regions on rear sides of the left wall portion 29 and the right wall portion 30. The lower side region 53 configures the lower wall portion 28 and regions on lower sides of the left wall portion 29 and the right wall portion 30. The front side panel 55 mainly configures a region of the front wall portion 27 (specifically, the front wall portion 27 and regions on front sides of the left wall portion 29 and the right wall portion 30) in the bag main body 26 when inflation is completed. An external form of the front side panel 55 in a flattened state is configured in such a way as to approximately coincide with the lower side region 53 and the upper side region 52 in a state opened in such a way that edge portions (an upper edge 52c and a front edge 53c) remaining when a lower left edge 52a and a rear left edge 53a, and a lower right edge 52b and a rear right edge 53b, disposed to the left and right of a coupled region 51a wherein the upper side region 52 and the lower side region 53 are coupled in the occupant side panel 51, are joined to each other, are separated from each other. The front side panel 55 and the occupant side panel 51 are bilaterally symmetrical each. Further, the bag main body 26 of the embodiment is formed in a bag form by an outer peripheral edge 55a of the front side panel 55 and the upper edge 52c and the front edge 53c of the occupant side panel 51 in a state wherein the lower left edge 52a and the rear left edge 53a, and the lower right edge 52b and the rear right edge 53b, are joined to each other as heretofore described, being joined.

As shown in FIG. 8, the connection port portion panel 60 configuring the connection port portion 45 includes an upper side panel 61, which is disposed on an upper side (the lower wall portion 28 side), and a lower side panel 62, which is disposed on a lower side opposing the upper side panel 61 in the up-down direction. As shown in FIG. 7, the upper side panel 61 is disposed to the left of the apertures 38, and configures a region on an upper side of a region in a vicinity of the leading end side region 45b of the connection port portion 45. The lower side panel 62 covers a region below the apertures 38, and includes a base portion side region configuring a portion 63, which configures the base portion side region 45a of the connection port portion 45, and a leading end side region configuring a portion 64, which configures the leading end side region 45b. Further, the connection port portion 45 is configured in a tubular form wherein the leading end side is opened by a remaining front edge 61b and rear edge 61c of the upper side panel 61, in a state wherein a right edge 61a is joined to the lower wall portion 28 side, being joined to a front edge 64a and a rear edge 64b of the leading end side region configuring portion 64 of the lower side panel 62 in a state wherein an outer peripheral edge 63a of the base portion side region configuring portion 63 is joined to the lower wall portion 28. As shown in FIG. 8, an external form of the attachment portion panel 66 configuring the attachment portion 47 is an approximately rectangular form, and the attachment portion panel 66 configures the attachment portion 47 by being folded in two, and lateral direction side edge portions being joined to each other.

In the occupant protection device S of the embodiment, when the inflator 17 operates in a state wherein the occupant MP is seated in the seat 1 mounted in the vehicle while fastening the seat belt 7, an inflating gas discharged from the inflator 17 flows from the connection port portion 45 into the bag main body 26 through the coupling tube 19. Further, inflation of the bag main body 26 is completed, as shown by a double-dotted chain line of FIG. 3 and in FIGS. 11 and 12, while the bag main body 26 in the airbag 25 protrudes frontward and upward from the lap belt 10 in such a way as to cause the cover 22 to break.

Further, in the occupant protection device S of the embodiment, the airbag 25 is of a configuration wherein the lower side restraining face 41b, which can restrain a region from the abdominal portion MA to the chest portion MB of the occupant MP, and the upper side restraining face 41a, which can restrain a region from the head portion MH or the shoulder portion MS (in the case of the embodiment, the head portion MH) of the occupant MP, are disposed on the rear face 33 side of the occupant side wall portion 32 disposed on the occupant MP side when inflation is completed. In the completely inflated airbag 25, the upper side restraining face 41a is disposed in such a way as to protrude to the occupant MP side (rearward) with respect to the lower side restraining face 41b owing to the bended (curved) portion 34 disposed in the occupant side wall portion 32. That is, in the occupant protection device S of the embodiment, when the occupant MP is received by the completely inflated airbag 25, the airbag 25 is such that the upper side restraining face 41a disposed in proximity to the occupant MP side is brought into contact with the head portion MH or the shoulder portion MS (in the case of the embodiment, the head portion MH) of the occupant MP prior to the airbag 25 coming into contact with the chest portion MB or the abdominal portion MA. That is, the inflated airbag 25 can be restricted from immediately coming into contact with the chest portion MB. Because of this, the occupant MP, who moves forward while a state of being restrained by the seat belt 7 is maintained, is such that the chest portion MB or the abdominal portion MA is restrained by the lower side restraining face 41b in a state wherein kinetic energy is reduced by the head portion MH or the shoulder portion MS being brought into contact with the upper side restraining face 41a of the completely inflated airbag 25. Then, the occupant MP can be appropriately protected by the inflated airbag 25. As a result of this, in the occupant protection device S of the embodiment, the chest portion MB being pressed by the inflated airbag 25 can be restricted, and the head portion MH can be restrained swiftly by the upper side restraining face 41a disposed in proximity.

Consequently, in the occupant protection device S of the embodiment, the upper body MU of the occupant MP can be restrained gently.

Figure 13:
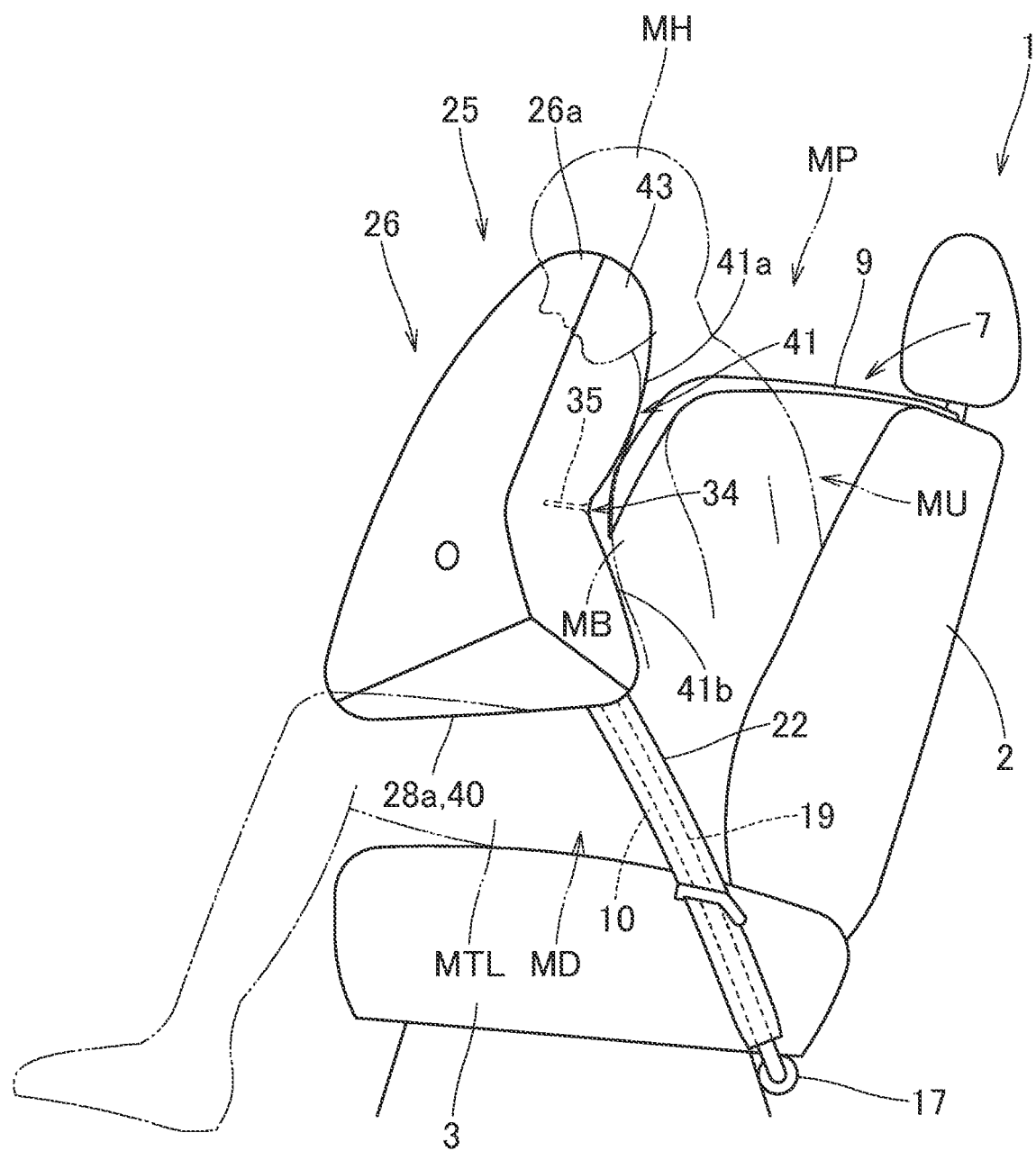
FIG. 13 is a side view showing a state wherein an occupant is restrained by the completely inflated airbag in the occupant protection device of the embodiment.

Also, in the occupant protection device S of the embodiment, the supported face 40, which comes into contact with the thigh portion MT of the occupant MP and is supported by the thigh portion MT, is disposed on the lower end side of the bag main body 26 of the airbag 25 when inflation is completed. This means that when the upper body MU is restrained by the upper body restraining face 41 including the upper side restraining face 41a and the lower side restraining face 41b, the lower face side of the bag main body 26 is supported by left and right thigh portions MT over a wide area via the supported face 40 (refer to FIGS. 11 and 12). This means that even when the occupant MP moves in such a way as to bring the upper body MU still nearer to the lower body MD while the upper body MU is restrained by the upper side restraining face 41a (refer to FIG. 13), the upper body MU of the occupant MP can be still more appropriately restrained by the bag main body 26, whose collapse, compression, and the like is restricted.

Figure 10:
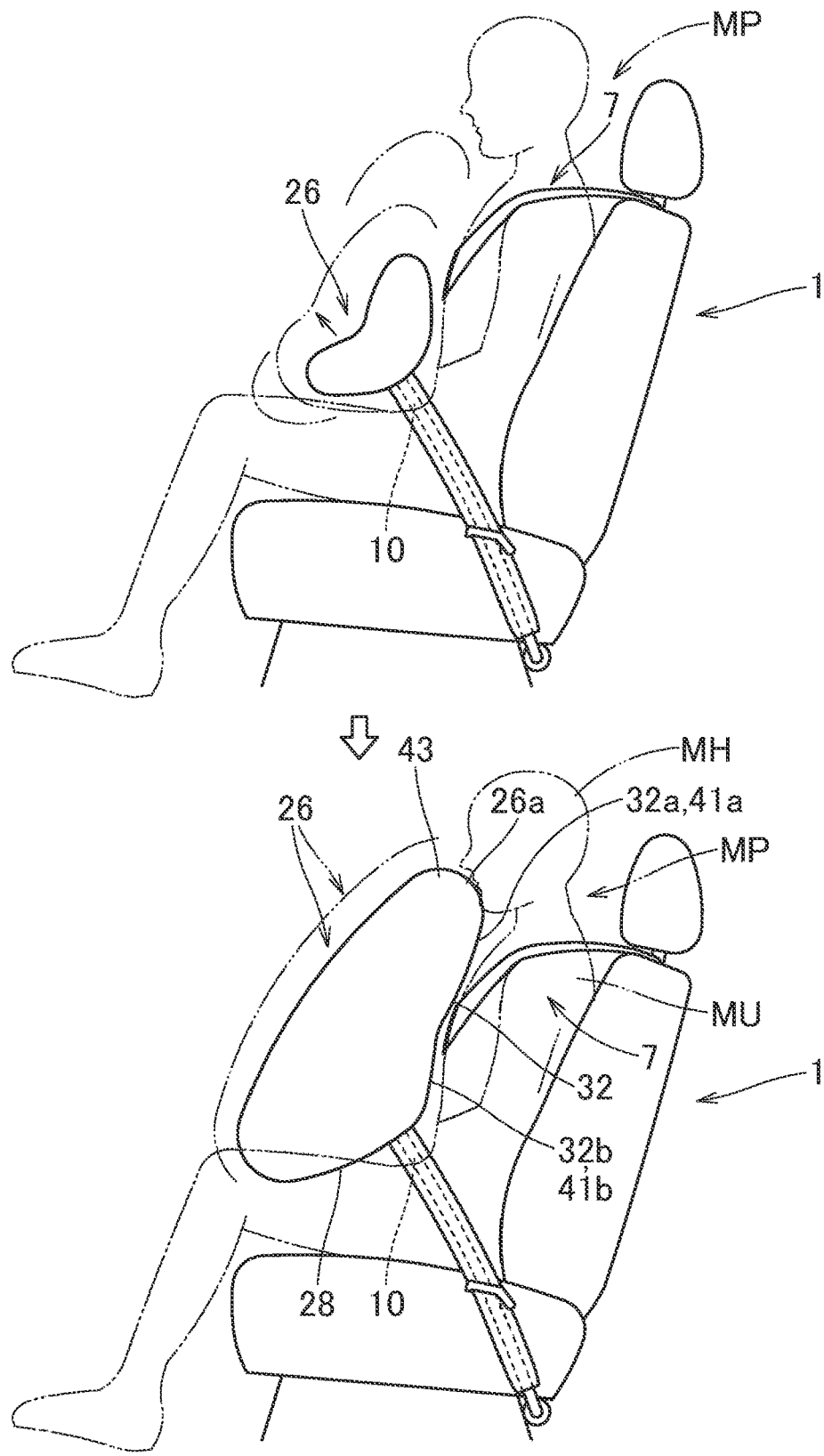
FIG. 10 is a schematic side view illustrating a process of inflating the airbag in the occupant protection device of the embodiment.

In particular, in the occupant protection device S of the embodiment, the bag main body 26 of the airbag 25 is of a configuration such that, in a state inflated individually as shown in FIG. 6, the lower side restraining face 41b (the lower side region 32b of the occupant side wall portion 32) is caused to intersect the lower wall portion 28 (the supported face 40) at a large intersection angle (an obtuse angle). In the occupant protection device S of the embodiment, to describe behavior of the bag main body 26 at an initial stage of inflation, inflating gas is caused to flow into the interior, and when inflating while protruding frontward and upward from the lap belt 10 while eliminating folds, the bag main body 26 becomes wide in the up-down direction. At this time, because the occupant side wall portion 32 intersects the lower wall portion 28 at a large intersection angle, the occupant side wall portion 32 can be caused to deploy in such a way as to head swiftly toward the upper body MU of the occupant MP. Specifically, the lower wall portion 28 temporarily inclines frontward and downward in accompaniment to a protrusion frontward and upward of the bag main body 26, but as the occupant side wall portion 32 intersects the lower wall portion 28 at a large intersection angle, the upper end side of the occupant side wall portion 32 (the upper end 26a side of the bag main body 26, that is, the head portion protection portion 43) can be disposed swiftly in proximity to a region in front of the head portion MH of the occupant MP (refer to FIG. 10). Further, in the occupant protection device S of the embodiment, at this time, the bended (curved) portion 34 is provided in the occupant side wall portion 32, and the lower side restraining face 41b (the lower side region 32b) positioned on the lower side of the bended portion 34 is not caused to protrude farther rearward than the upper side restraining face 41a (the upper side region 32a) positioned on the upper side of the bended portion 34. Because of this, the occupant side wall portion 32 (the lower side restraining face 41b) of the bag main body 26 that inflates in this way coming into contact with the chest portion MB of the occupant MP can be appropriately restricted. Also, in the occupant protection device S of the embodiment, the head portion MH of the occupant MP can be swiftly restrained by a region on the upper end side of the occupant side wall portion 32 (the upper side restraining face 41a, the head portion protection portion 43), which moves (deploys) swiftly.

Also, in the occupant protection device S of the embodiment, the bended portion 34 disposed in the occupant side wall portion 32 is configured of the tuck portion 35 formed by the occupant side wall portion 32 being pinched in regions separated on up-down direction sides in an up-down direction intermediate region of the occupant side wall portion 32, and the regions being joined to each other. That is, in the occupant protection device S of the embodiment, with the tuck portion 35 itself as the bended portion 34, the occupant side wall portion 32 is bended with the tuck portion 35 as a starting point. Because of this, a bending position and a bending state of the occupant side wall portion 32 when inflation of the airbag 25 is completed can be stabilized. Also, in the occupant protection device S of the embodiment, the bended portion 34 is disposed in front of the chest portion MB of the occupant MP when inflation of the airbag 25 is completed, because of which the inflated airbag 25 coming into contact with the chest portion MB of the occupant MP can be delayed as far as possible.

Figure 14:
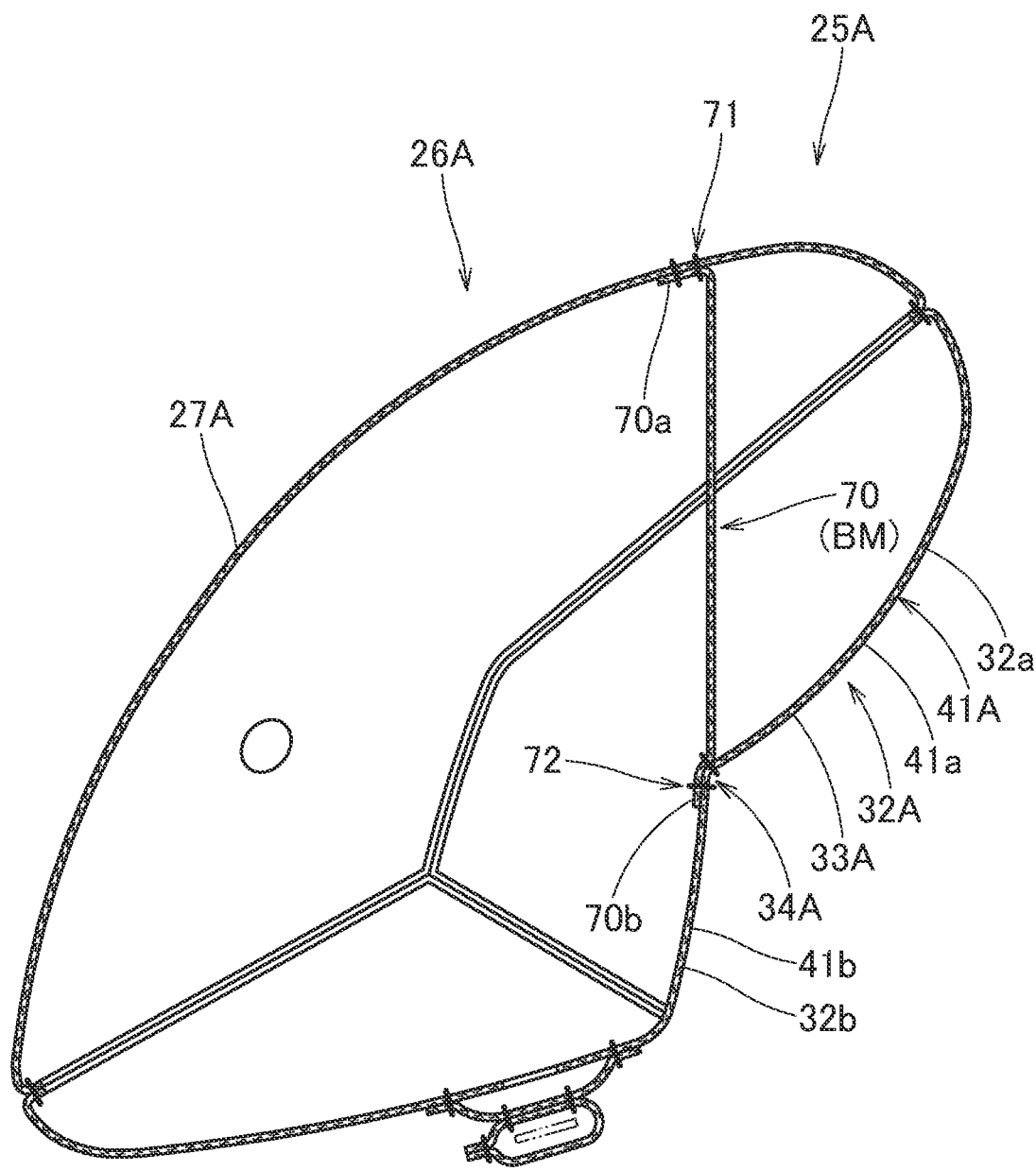
FIG. 14 is a schematic vertical sectional view showing a state wherein an airbag that is another embodiment of the present disclosure is inflated individually.
Figure 15:
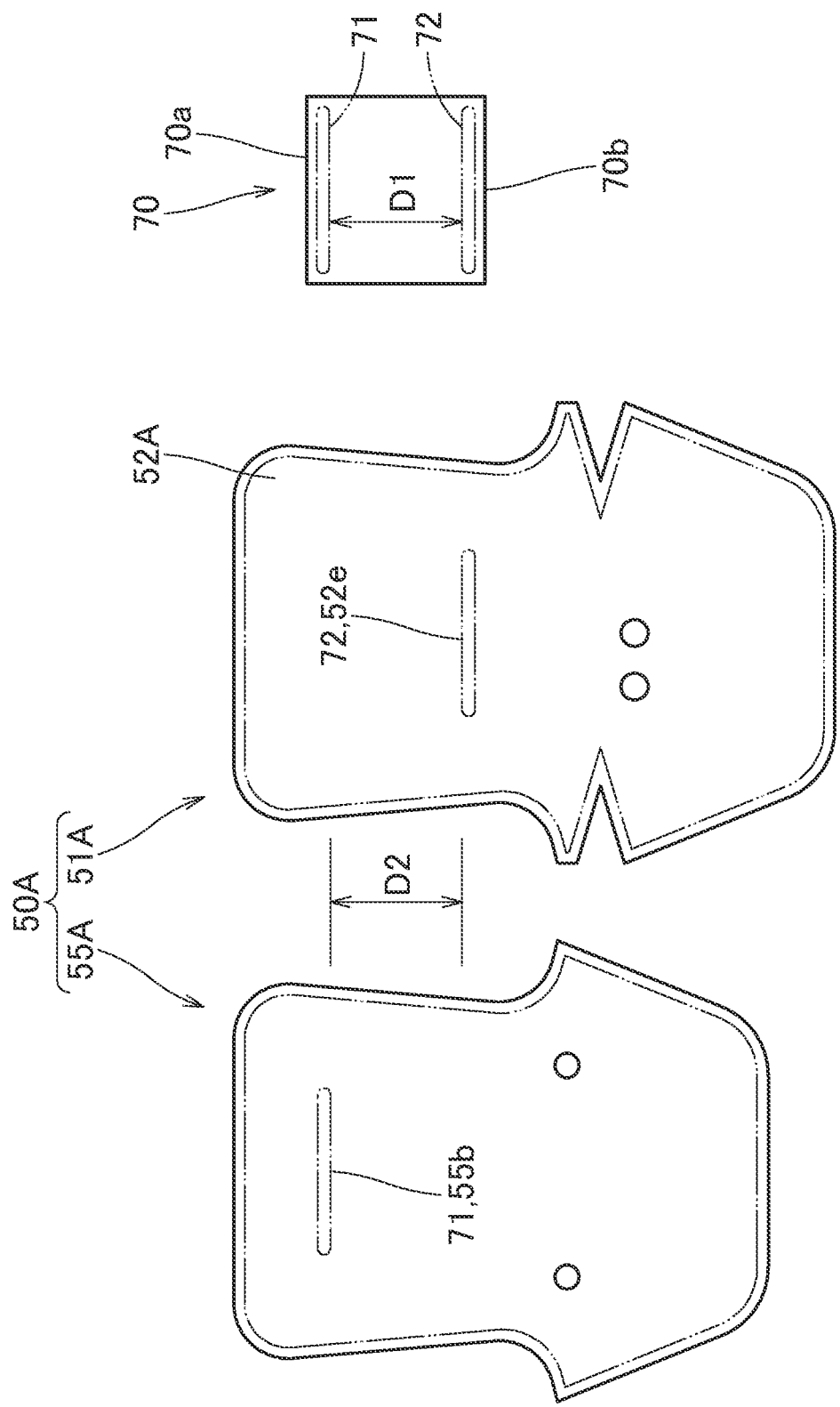
FIG. 15 is a plan view wherein base materials configuring a bag main body in the airbag of FIG. 14 and an inner side tether portion are aligned.

An airbag of a configuration shown in FIG. 14 may be used as an airbag 25A. The airbag 25A is such that a bended (curved) portion 34A provided in an occupant side wall portion 32A is formed not by a tuck portion but by an inner side tether portion 70 acting as the bended portion forming means BM disposed inside the bag main body 26A, other than which a configuration is identical to that of the airbag 25. Because of this, an identical member is such that "A" is added to the end of an identical reference sign, and a detailed description is omitted. Also, a main body panel 50A (a front side panel 55A and an occupant side panel 51A) configuring the bag main body 26A is of an external form identical to that of the main body panel 50 (the front side panel 55 and the occupant side panel 51) configuring the bag main body 26, as shown in FIG. 15.

The inner side tether portion 70 acting as the bended portion forming means BM is disposed inside the bag main body 26A in such a way as to couple a front wall portion 27A and the occupant side wall portion 32A. The inner side tether portion 70 is a strip form body formed of a sheet body having flexibility (specifically, a woven fabric formed of the same polyamide, polyester, or the like as a base material configuring the bag main body 26A). The inner side tether portion 70 is such that one end portion 70a side is joined to the front wall portion 27A, and another end portion 70b side is coupled to the occupant side wall portion 32A. An occupant side joining region 72 (a joint formation portion 52e in an upper side region 52A of the occupant side panel 51A) in which the end portion 70b of the inner side tether portion 70 is caused to join the occupant side wall portion 32A is formed in a position that is approximately identical to the formation position of the tuck portion 35 (the tuck formation portion 52d) in the bag main body 26 (refer to FIGS. 8 and 15). Also, a width dimension of the inner side tether portion 70 is set to be approximately equivalent to a length dimension of the tuck portion 35 (refer to FIGS. 8 and 15). A front side joining region 71 (a joint formation portion 55b in the front side panel 55A) in which the end portion 70a of the inner side tether portion 70 is caused to join the front wall portion 27A is disposed in a position that is approximately directly above the occupant side joining region 72 in a state wherein the bag main body 26A is inflated (refer to FIG. 14), and is formed in a position farther to the upper side than the joint formation portion 52e formed in the upper side region 52A in a flattened state in a state wherein the front side panel 55A is flattened. Also, in the embodiment, a length dimension of the inner side tether portion 70 (a distance of separation D1 between the front side joining region 71 and the occupant side joining region 72 formed in the end portions 70a and 70b respectively) is set to be approximately identical to a distance of separation D2 between the joint formation portion 52e formed in the upper side region 52A and the joint formation portion 55b formed in the front side panel 55A in a state wherein the occupant side panel 51A and the front side panel 55A are flattened, and a state wherein upper edge positions are caused to coincide (refer to FIG. 15).

In the bag main body 26A, when inflation is completed, the occupant side wall portion 32A is bended with a region of the occupant side joining region 72 in which the inner side tether portion 70 is caused to join the occupant side wall portion 32A as a starting point, and a region of the occupant side joining region 72 configures the bended portion 34A. Further, the bag main body 26A (the airbag 25A) having this kind of configuration is also such that when inflation is completed, the upper side restraining face 41a disposed on a rear face 33A side is disposed in such a way as to protrude to the occupant side (the rearward side) with respect to the lower side restraining face 41b owing to the bended portion 34A disposed in the occupant side wall portion 32A.

Figure 16:
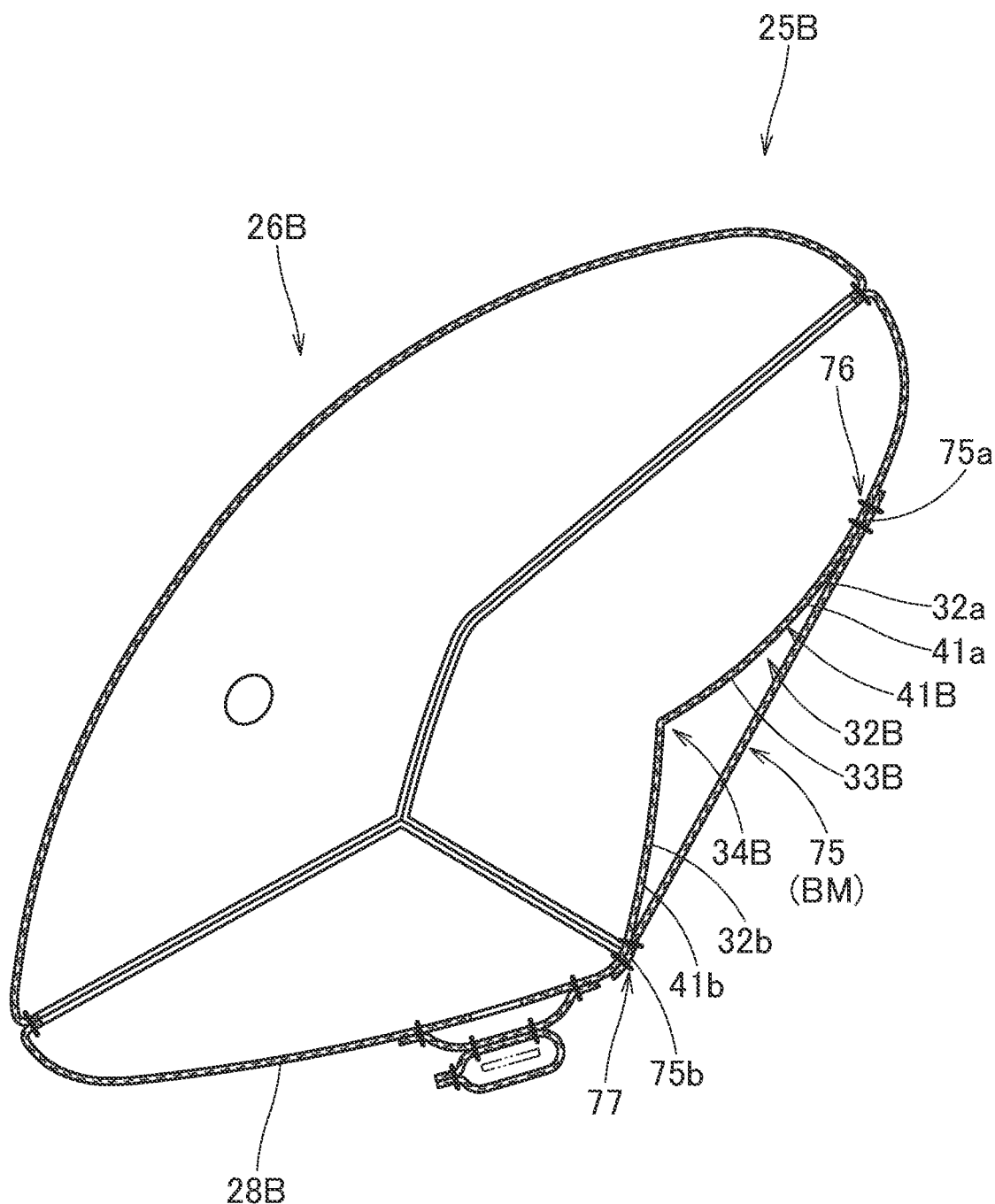
FIG. 16 is a schematic vertical sectional view showing a state wherein an airbag that is still another embodiment of the present disclosure is inflated individually.
Figure 17:
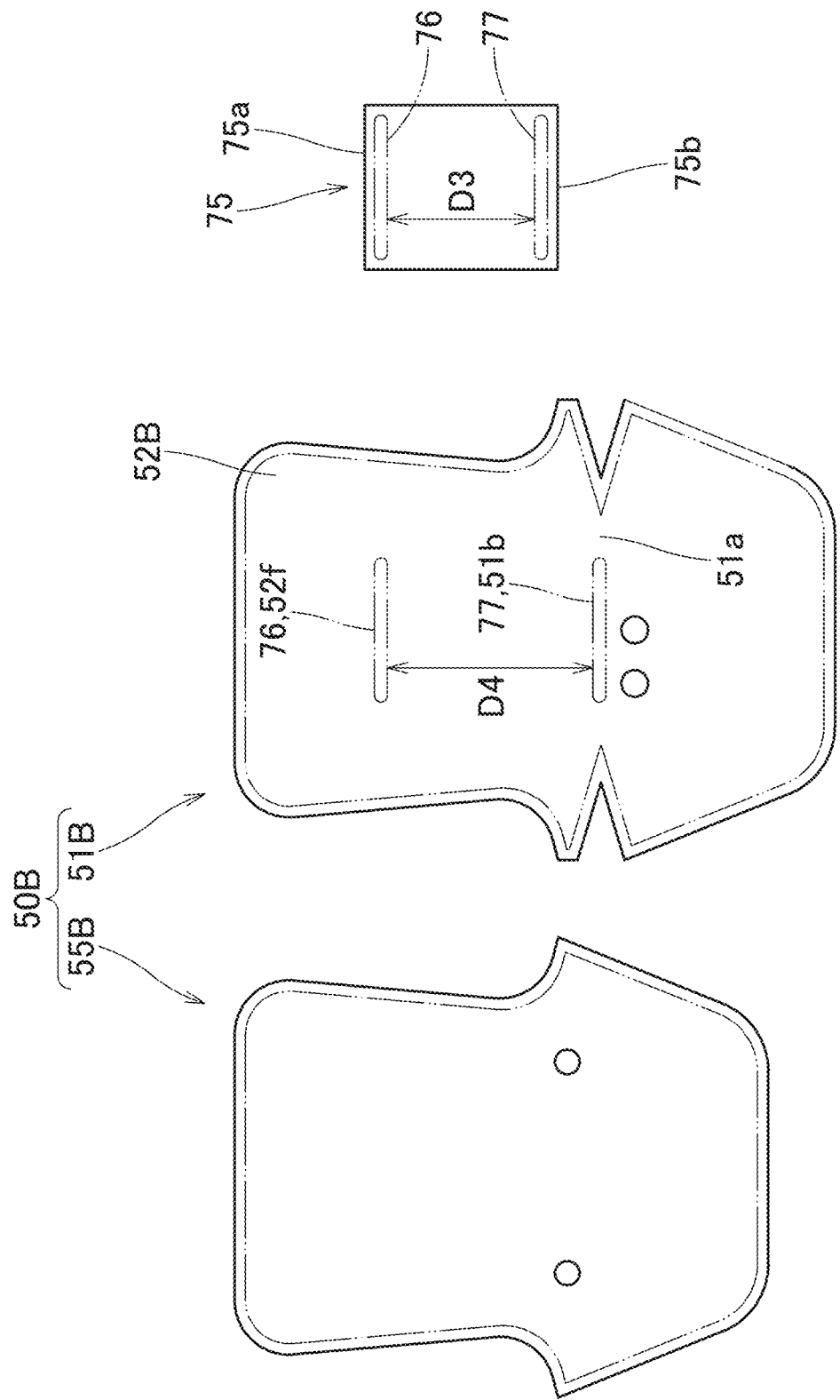
FIG. 17 is a plan view wherein base materials configuring a bag main body in the airbag of FIG. 16 and an outer side tether portion are aligned.

Also, an airbag of a configuration shown in FIG. 16 may be used as an airbag 25B. The airbag 25B is such that a bended portion 34B provided in an occupant side wall portion 32B is formed not by a tuck portion but by an outer side tether portion 75 acting as the bended portion forming means BM disposed on a rear face 33B side of the occupant side wall portion 32B, other than which a configuration is identical to that of the airbag 25. Because of this, an identical member is such that "B" is added to the end of an identical reference sign, and a detailed description is omitted. Also, a main body panel 50B (a front side panel 55B and an occupant side panel 51B) configuring a bag main body 26B is also of an external form identical to that of the main body panel 50 (the front side panel 55 and the occupant side panel 51) configuring the bag main body 26, as shown in FIG. 17.

The outer side tether portion 75 acting as the bended portion forming means BM is disposed on the rear face 33B side of the occupant side wall portion 32B (outside the bag main body 26B) in such a way as to couple each of an upper end 75a side and a lower end 75b side to the occupant side wall portion 32B. The outer side tether portion 75 is also a strip form body formed of a sheet body having flexibility (a woven fabric formed of the same polyamide, polyester, or the like as a base material configuring the bag main body 26B), in the same way as the inner side tether portion 70. Also, a width dimension of the outer side tether portion 75 is set to be approximately equivalent to the width dimension of the inner side tether portion 70 (refer to FIGS. 15 and 17). A lower side joining region 77 (a lower side joint formation portion 51b in the occupant side panel 51B) in which the lower end 75b side of the outer side tether portion 75 is caused to join the occupant side wall portion 32B is formed on a lower end side of the occupant side wall portion 32B, in a vicinity of a boundary region between the occupant side wall portion 32B and a lower wall portion 28B (a vicinity of the coupled region 51a (the boundary region) in which an upper side region 52B and a lower side region 53B are coupled in the occupant side panel 51B in a flattened state). An upper side joining region 76 (an upper side joint formation portion 52f in the upper side region 52B of the occupant side panel 51B) in which the upper end 75a side of the outer side tether portion 75 is caused to join the occupant side wall portion 32B is disposed in a position farther to the rear and above the lower side joining region 77 in a state wherein the bag main body 26B is inflated (refer to FIG. 16). The upper side joint formation portion 52f (the upper side joining region 76) is formed in a position slightly above an up-down direction center of the upper side region 52B in a state wherein the occupant side panel 51B is flattened, as shown in FIG. 17. A length dimension of the outer side tether portion 75 (a distance of separation D3 between the upper side joining region 76 and the lower side joining region 77) is set to be smaller than a distance of separation D4 between the upper side joint formation portion 52f and the lower side joint formation portion 51b in the occupant side panel 51B in a flattened state, and more specifically, is set to be in the region of three-quarters of D4 (refer to FIG. 17).

In the bag main body 26B, when inflation is completed, the occupant side wall portion 32B is bended in a position in an approximate center between the upper side joining region 76 and the lower side joining region 77, and in the case of the embodiment, the occupant side wall portion 32B is bended in such a way that the bended portion 34B is disposed in a position approximately equivalent to those of the bended portions 34 and 34A in the airbags 25 and 25A respectively. Further, in the bag main body 26B (the airbag 25B) having this kind of configuration, when inflation is completed, the upper side restraining face 41a disposed on the rear face 33B side is disposed in such a way as to protrude to the occupant side (the rearward side) with respect to the lower side restraining face 41b owing to the bended portion 34B disposed in the occupant side wall portion 32B.

In the occupant protection device S of the embodiment, the lap belt 10 of the seat belt 7 is utilized as a holding body in which the airbag 25 is caused to be held, but a holding body in which an airbag is caused to be held is not limited to a lap belt. For example, a configuration such that a holding body that is a body separate from a seat belt is provided, and an airbag is caused to be held in the holding body, may be adopted. Although the occupant protection device S of the embodiment is of a configuration such that the airbag 25 is caused to be held in the lap belt 10 of the seat belt 7, the inflator 17 operates later (in the region of 5 milliseconds) than an operation of the pretensioner mechanism of the seat belt 7. Because of this, the airbag 25 can be caused to inflate in a state wherein the occupant MP is seated in the seat 1 is stably maintained by the seat belt 7, and the occupant MP can be stably protected by the airbag 25 and the seat belt 7.

Also, in the occupant protection device S of the embodiment, the seat belt 7 and the inflator 17 are mounted on the seat 1. This means that even when used in a state wherein the seat 1 is caused to move with respect to the vehicle by being slid considerably to the front or rear, or by being rotated, the occupant MP seated in the seat 1 can be appropriately protected by the airbag 25. Of course, an occupant protection device of the present invention not being limited to a seat of this kind of configuration, the occupant protection device can be mounted on a seat of a type wherein an occupant is restrained by a seat belt such that a retractor is provided on a vehicle body side. Also, an inflator may also be of a configuration attached to a vehicle body side.

The present disclosure relates to an occupant protection device of the following configuration.

An occupant protection device for protecting an occupant seated in a seat is of a configuration including an airbag as a bag form configured of a sheet body having flexibility, a holding body in which the folded airbag is caused to be housed and held, and which is disposed in front of a hip portion of an occupant seated in a seat, and an inflator that can supply an inflating gas to the airbag, wherein the airbag is of a configuration such as to protrude from the holding body owing to the inflating gas being caused to flow into an interior, and inflates in such a way as to cover a region in front of the occupant, and is configured to include an occupant side wall portion that is disposed on the occupant side when inflation is completed, and can restrain an upper body of the occupant, and the occupant side wall portion is configured in such a way that a lower side restraining face, which can restrain a range from an abdominal portion to a chest portion of the occupant, and an upper side restraining face, which can restrain a head portion or a shoulder portion of the occupant, are disposed on a rear face side when inflation is completed, and a curved (bended) portion is disposed in a boundary region between the upper side restraining face and the lower side restraining face in such a way as to cause the upper side restraining face to protrude to the occupant side with respect to the lower side restraining face.

In the occupant protection device of the present disclosure, the airbag is of a configuration wherein a lower side restraining face, which can restrain a range from an abdominal portion to a chest portion of an occupant, and an upper side restraining face, which can restrain a head portion or a shoulder portion of the occupant, are disposed on a rear face side of an occupant side wall portion disposed on the occupant side when inflation is completed. In the completely inflated airbag, the upper side restraining face is disposed in such a way as to protrude to the occupant side with respect to the lower side restraining face owing to a bended (curved) portion disposed in the occupant side wall portion. That is, in the occupant protection device of the present disclosure, when the occupant is received by the completely inflated airbag, the airbag is such that the upper side restraining face disposed in proximity to the occupant side is brought into contact with the head portion or the shoulder portion of the occupant prior to the airbag coming into contact with the chest portion or the abdominal portion. That is, the inflated airbag can be restricted from immediately coming into contact with the chest portion. Because of this, the occupant protection device of the present disclosure is such that the chest portion being pressed by the inflated airbag can be restricted, and the head portion can be restrained swiftly by the upper side restraining face disposed in proximity.

Consequently, the occupant protection device of the present disclosure is such that an upper body of an occupant can be restrained gently.

The occupant protection device of the present disclosure is such that a tuck portion formed in an occupant side wall portion itself, an inner side tether portion disposed in such a way as to cause a front wall portion and an occupant side wall portion to be coupled inside an airbag, and an outer side tether portion disposed on a rear face side of an occupant side wall portion, can be given as examples of bended portion forming means that causes a bended portion to bend.

What is claimed is:

1. An occupant protection device for protecting an occupant seated in a seat, the occupant protection device comprising:
    an airbag as a bag form configured of a sheet body having flexibility;
    a holding body in which the airbag as folded is caused to be housed and held, and which is configured and adapted so as to be disposed in front of a hip portion of an occupant seated in the seat; and
    an inflator that can supply an inflating gas to the airbag, wherein
    the airbag is of a configuration such as to protrude from the holding body owing to the inflating gas being caused to flow into an interior, and is configured and adapted so as to inflate in such a way as to cover a region in front of the occupant, and is configured to include an occupant side wall portion that is disposed on an occupant side when inflation is completed, and adapted to restrain an upper body of the occupant,
    the occupant side wall portion is configured in such a way that a lower side restraining face, which can restrain a range from an abdominal portion to a chest portion of the occupant, and an upper side restraining face, which can restrain a head portion or a shoulder portion of the occupant, are disposed on a rear face side when inflation is completed, and a bended portion is disposed in a boundary region between the upper side restraining face and the lower side restraining face in such a way as to cause the upper side restraining face to protrude to the occupant side with respect to the lower side restraining face,
    the holding body comprises a lap belt that is configured and adapted so as to restrain the hip portion of the occupant when a seat belt is fastened, and a cover which covers the folded airbag which is stacked on an upper face side of the lap belt, the upper face side being adapted and disposed to face away from the hip portion when fastened, and
    an inflatable portion of the airbag protrudes diagonally frontward and upward away from the upper face side at airbag deployment, and the inflatable portion is stacked on the upper face side at airbag deployment.

2. The occupant protection device according to claim 1, wherein
    bended portion forming means that forms the bended portion is configured of a tuck portion formed by the occupant side wall portion being pinched in regions separated on up-down direction sides, and the regions being joined to each other, in an up-down direction intermediate region of the occupant side wall portion.

3. The occupant protection device according to claim 1, wherein
    the airbag includes a front wall portion disposed in such a way as to oppose the occupant side wall portion on a front-rear direction side when inflation is completed, and
    bended portion forming means that forms the bended portion is configured of an inner side tether portion disposed in such a way as to couple the front wall portion and the occupant side wall portion in an interior of the airbag.

4. The occupant protection device according to claim 1, wherein
    bended portion forming means that forms the bended portion is configured of an outer side tether portion that causes each of an upper end side and a lower end side to be joined to the occupant side wall portion on a rear face side of the occupant side wall portion, and
    an up-down direction side width dimension of the outer side tether portion is set to be smaller than a distance of separation between regions to which the upper end side and the lower end side of the outer side tether portion are joined in the occupant side wall portion in a flattened state.

5. The occupant protection device according to claim 1, wherein
    the airbag is such that a supported face that is configured and adapted so as to come into contact with a thigh portion of the occupant, and to be supported by the thigh portion, is disposed on a lower end side when inflation is completed.

6. The occupant protection device according to claim 5, wherein
the lower side restraining face is configured in such a way as to intersect the supported face at an obtuse angle in a state wherein the airbag is caused to inflate individually.

7. The occupant protection device according to claim 1, wherein
the seat belt and the inflator are of a configuration mounted on the seat.

* * * * *